May 8, 1945.  A. H. TALBOT ET AL  2,375,448
BORING TOOL SETTING GAUGE
Filed Feb. 4, 1944  2 Sheets-Sheet 1
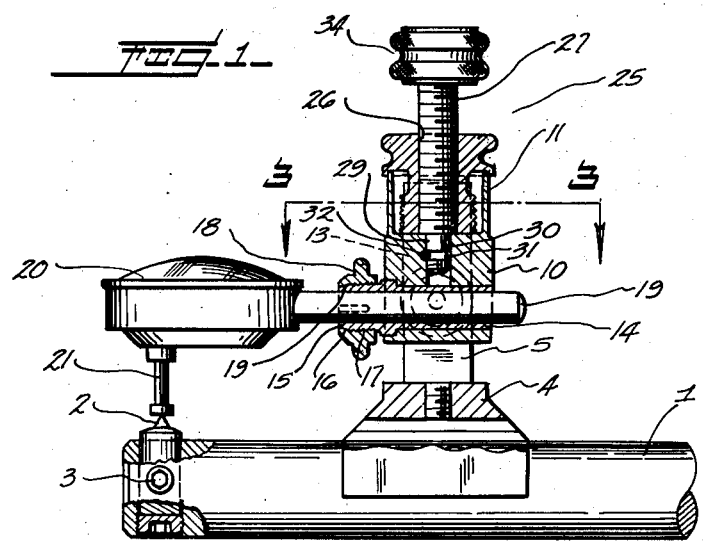
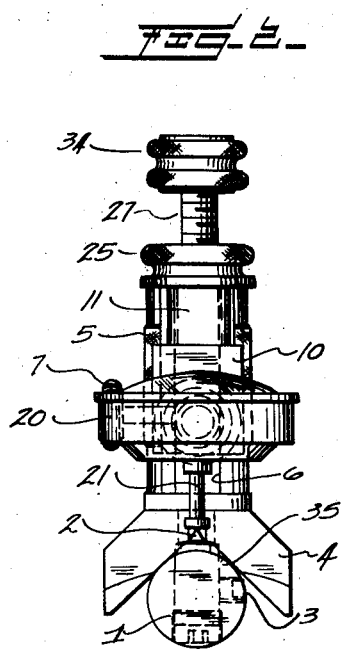
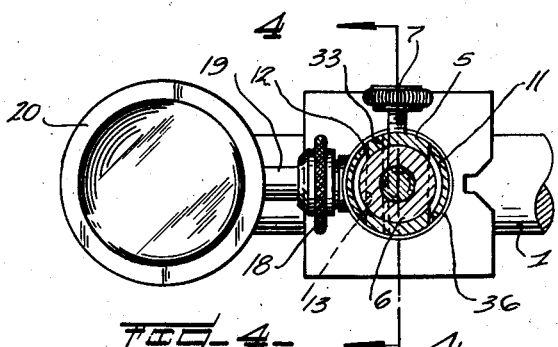
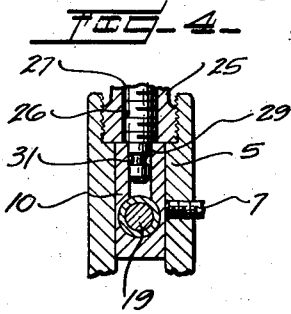
INVENTORS.
ALFRED H. TALBOT
BY HARRY H. KROH
Bryant & Lowry
atty

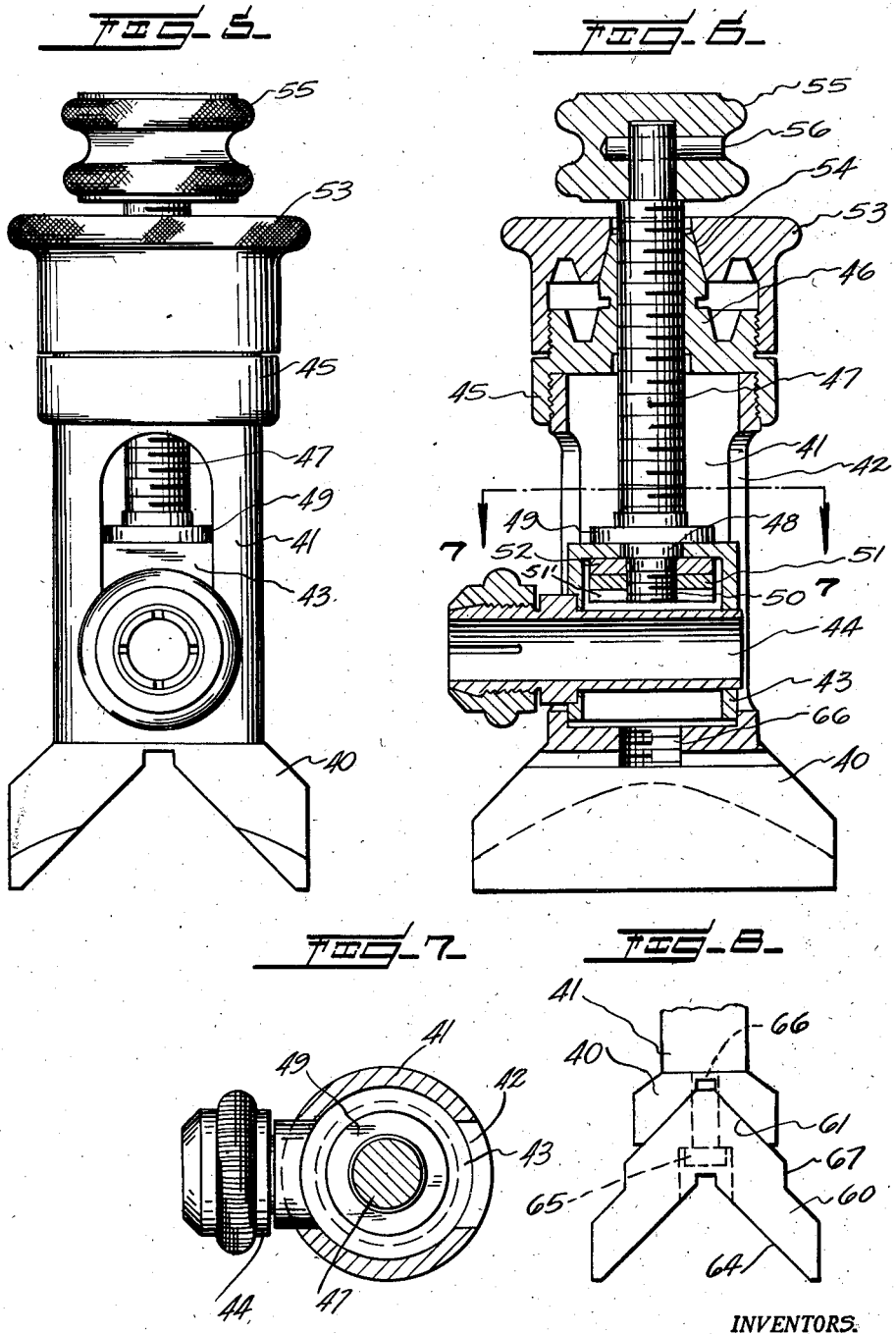

Patented May 8, 1945

2,375,448

UNITED STATES PATENT OFFICE 2,375,448

BORING TOOL SETTING GAUGE

Alfred H. Talbot and Harry H. Kroh, Flint, Mich.; said Kroh assignor of one-sixth to said Talbot Application February 4, 1944, Serial No. 521,072

7 Claims. (Cl. 33—185)

The present invention pertains to a novel boring tool setting gauge for accurately setting a cutting tool, especially of the fly-cutting type, at a predetermined distance from the surface of a boring bar carrying the tool.

The principal object of the invention is to provide such a gauge by means of which a cutting tool can be set at a predetermined precise dimension, thereby eliminating the old trial and error method.

Another object of the invention is to provide a simple, inexpensive and reliable device incorporating a dial indicator for performing the stated operation. The device of the invention includes a body adapted to be seated on a boring bar and having a slide accurately adjustable therein. The slide carries a dial indicator having a plunger adapted to engage the tip of the tool to be set. After adjusting the indicator to a suitable level by means of the slide, the distance between the tool tip and the surface of the boring bar can be accurately measured and adjusted to the desired value.

A further object is to adapt the device for measuring distances beyond the range of the indicator. This object is accomplished by the provision of a riser block shaped for insertion between the boring bar and the device.

The invention is fully disclosed by way of example in the following description and in the accompanying drawings in which Figure 1 is a vertical section of the device, partly in elevation;

Figure 2 is an elevation at right angles to Figure 1;

Figure 3 is a section on the line 3—3 of Figure 1;

Figure 4 is a section on the line 4—4 of Figure 3;

Figure 5 is a front elevation of a modified form;

Figure 6 is a vertical section thereof;

Figure 7 is a section on the line 7—7 of Figure 6, and

Figure 8 is a detail elevation showing the use of a riser block.

In Figure 1 is shown a boring bar 1 carrying in the usual manner a boring tool 2 of the fly-cutting type, such as a diamond-tip tool, for example. The tool is adjustable radially of the bar and is secured in the adjusted position by a set screw 3, as well known in the art.

The tool setting gauge constituting this invention includes a base 4 on which is formed a pair of spaced parallel rails 5, each of which is formed with a flat inner face 6 running lengthwise of the rail. A set screw 7 is threaded through one of the rails for a purpose that will presently be described.

Between the rails, which are unconnected at their upper ends, is mounted a slide block 10, formed at opposite ends with upstanding shoes 11 that overlap on the parallel side walls 12 of the rails, while the flat sides 13 of the block run on the flat faces 6 of the rails. The fit of the block on the rails is accurate, so that the block cannot tilt.

The body of the block has a collect sleeve 14 fitted therein and lying parallel to the faces 13 and perpendicular to the rails 5. One end of the sleeve projects beyond the block through one of the spaces between the rails 5 and is split to form collect fingers 15. The fingers are bevelled at 16 and threaded at 17 beyond the fingers to receive a nut 18 having an inside taper 19 bearing on the bevel 16 to compress the fingers on a member inserted in the sleeve.

The inserted member is a stem or rod 19 carrying a conventional dial indicator 20. The slidable plunger 21 of the indicator extends towards the boring bar 1 and is utilized in a manner presently to be described.

A threaded column cap 25 is screwed between the upper ends of the rails 5 and is tapped at 26 to receive an adjusting screw 27. The head of the cap 25 is preferably knurled as shown. The lower reduced end 29 of the screw 27 is rotatably received in a hole 30 in the body of the block 10. The end 29 is grooved circumferentially at 31 to receive a wire key 32 driven into a transverse bore 33 drilled tangentially to the hole 30. The upper or outer end of the screw 27 is provided with a knurled head 34.

The use of the gage will now be described. The bottom of the base 4 is formed with an inverted V-groove 35 adapted to receive the boring bar 1 and seat thereon. Let it be assumed that the diameter of the boring bar is .750′ and the diameter of the hole to be bored is 1.000′. The slide block 10 is adjusted on the rails 5, by the screw 27, at an elevation that permits the indicator plunger 21 to engage with slight tension the boring bar 1 when the base 4 is seated on the bar in the manner described. The block 10 is locked in this position by the set screw 7. With the plunger 21 engaging the boring bar, the dial of the indicator is turned until the reducing is zero.

The distance that the tool tip must be set from the surface of the boring bar is .125′ or half the difference between the diameter of the bar and the diameter of the hole to be bored. The device is then slid along the bar until the plunger 21 is directly over the tool, and the tool is advanced against the plunger until the indicator reads .125'. The tool is now in position for cutting, assuming that the hole has already been rough-bored and is prepared to take the final cut.

The device can also be used where a hole of known diameter has already been bored by the tool 2 and is to be enlarged a known amount. The indicator is adjusted so that it engages the tool tip with a slight tension, and the dial is turned to zero. The tool is then advanced until the indicator reads half the desired increase in diameter.

Other uses of the device will readily be suggested to those skilled in the art. For easy handling of the device, the outer surfaces of rails 5 are concentric and knurled; and the outer surfaces 36 of the shoes are convex in the same cylindrical surface.

In the modification shown in Figures 5, 6 and 7, there is provided a base 40 on which is mounted a cylinder 41 having opposed longitudinal slots 42. In the cylinder is slidably mounted a cylindrical sleeve 43 closed at its upper end and in which is fitted, transversely, a collet assembly 44 substantially identical with that previously described and extending through one of the slots 42.

On the upper end of the cylinder 41 is screwed a cup 45 having an upwardly extending tapped conical hub 46. Through the hub is threaded an adjusting screw 47 having a blank lower end 48 rotatably mounted in the top of the sleeve 43 and formed with a flange 49 resting upon the sleeve. The lower extremity of the screw, within the sleeve 43, is threaded at 50 to receive a nut 51 with a screwdriver slot 51' for supporting a retaining washer 52 that bears against the top 48 of the sleeve, thereby mounting the screw rotatably in the sleeve. A lock nut 53 is screwed on the cap 45 and is formed with a conical recess 54 receiving the hub 46. By screwing the nut down on the hub 46, which is slotted to form a collet, the screw is locked in its adjusted position. This device, comprised of the nut and the hub, replaces the set screw 7 of the previously described construction. A knurled head 55 is fastened on the external end of the screw 47 by a pin 56.

This modification of the gauge is capable of all the uses of the previously described construction. In the use of either construction there may be a condition where the cutting tool extends through the boring bar a distance that is beyond the range of the indicator. For this condition there is provided a series of riser blocks, one of which is shown in Figure 8.

Each such block 60 is formed with a tapered end 61 shaped to fit accurately in the V-groove of the base 4 or 40. The opposite end of the riser block 60 is formed with a V-groove 64 adapted to seat on the boring bar in the manner previously described. The riser block is secured to the base 40 by a screw 65 entering a tapered hole 66 in the bottom of cylinder 41.

The riser block 60 is wider across the V than the base 40 and is therefore adapted for a larger boring bar. A riser block used only for height need not be substantially wider than the base 40 and may terminate at the shoulders 67.

Having thus fully disclosed our invention, what we claim and desire to secure by Letters Patent is:

1. A gauge of the character described comprising an elongated body having one end shaped to seat on a boring bar a slide mounted in said body to move lengthwise thereof to varying distances from said end, a screw threaded lengthwise in said body and having one end mounted in said slide, and means carried by said slide for supporting a dial indicator.

2. A gauge of the character described comprising an elongated body having one end shaped to seat on a boring bar a slide mounted in said body to move lengthwise thereof to varying distances from said end, a screw threaded lengthwise in said body and having one end mounted in said slide, means for locking said screw to said body, and means carried by said slide for supporting a dial indicator.

3. A gauge of the character described comprising an elongated body having one end shaped to seat on a boring bar a slide mounted in said body to move lengthwise thereof to varying distances from said end, a screw threaded lengthwise in said body and having one end mounted in said slide, a dial indicator carried by said slide and disposed externally of said body, and a measuring plunger extending from said indicator in substantially parallel relation to the axis of said body.

4. A gauge of the character described comprising an elongated body having one end shaped to seat on a boring bar a slide mounted in said body to move lengthwise thereof to varying distances from said end, means for adjusting said slide in said body, and a collet mounted in said slide transversely of said body, said body having a longitudinal opening through which said collet extends.

5. A gauge of the character described comprising an elongated body having one end shaped to seat on a boring bar a slide mounted in said body to move lengthwise thereof to varying distances from said end, means for adjusting said slide in said body, and a collet mounted in said slide transversely of said body, said body having a longitudinal opening through which said collet extends, a dial indicator supported by said collet externally of said body, and a measuring plunger extending from said indicator in substantially parallel relation to the axis of said body.

6. A gauge of the character described comprising an elongated body having one end shaped to seat on a boring bar, a slide mounted in said body to move lengthwise thereof to varying distances from said end, means for adjusting said slide in said body, a nut at one end of said body, a screw threaded in said nut and having one end mounted in said slide, and a lock nut applied to the first named nut.

7. A gauge of the character described comprising an elongated body having one end shaped to seat on a boring bar, a slide mounted in said body to move lengthwise thereof to varying distances from said end, means for adjusting said slide in said body, a nut at one end of said body, a screw threaded in said nut and having one end mounted in said slide, a cone projecting from said nut and receiving said screw, and a lock nut screwed on the first nut and having a conical recess receiving said cone.

ALFRED H. TALBOT.
HARRY H. KROH.